Dec. 10, 1968   J. P. PELMULDER ET AL   3,415,075
IMMERSION FREEZING

Original Filed Dec. 13, 1963                    7 Sheets-Sheet 1

INVENTORS
JOHN P. PELMULDER
ERIK THUSE

BY   Francis W. Anderson
                    ATTORNEY

FIG_4

Dec. 10, 1968   J. P. PELMULDER ETAL   3,415,075
IMMERSION FREEZING
Original Filed Dec. 13, 1963   7 Sheets-Sheet 4

FIG_5

FIG_6

INVENTORS
JOHN P. PELMULDER
ERIK THUSE
BY
Francis W. Anderson
ATTORNEY

United States Patent Office 3,415,075
Patented Dec. 10, 1968

3,415,075
IMMERSION FREEZING
John P. Pelmulder, Saratoga, and Erik Thuse, San Jose, Calif., assignors to FMC Corporation, San Jose, Calif., a corporation of Delaware
Original application Dec. 13, 1963, Ser. No. 330,298. Divided and this application Jan. 11, 1967, Ser. No. 632,471
3 Claims. (Cl. 62—381)

ABSTRACT OF THE DISCLOSURE

A refrigeration unit for subjecting foods to a flow of gaseous refrigerant embodies a turntable with baskets having open top and bottom walls, staggered refrigerant conduits above and below the turntable, a product inlet and outlet, and air locks between a refrigerant gas inlet and outlet and the product inlet and outlet.

---

This invention relates to refrigeration and more particularly to the quick freezing of delicate cellular products such as biologicals and food products. The apparatus and process of the present invention can be employed either to prepare the product for storage or for a subsequent freeze-drying operation. This is a division of application Ser. No. 330,298, filed Dec. 13, 1963.

With certain products of the type referred to, such as strawberries for example, freezing must be carried out rapidly by first immersing the strawberries in a cold liquid bath for quickly freezing a crust or shell on the exterior of the product. The product is removed from the bath and the freezing thereof is completed in a cold gas, so that the final product is frozen throughout after the temperature thereof has equalized.

It is an object of the present invention to provide a quick-freezing process of the type described which holds the thickness of the initially frozen shell or crust forming the outer layer of the product to a minimum.

Another object is to improve the efficiency, decrease the cost of operation, and minimize the consumption of the liquid which forms the freezing bath, such as liquid nitrogen or other cryogenic liquefied gasses.

A further object is to provide optimum temperature gradients throughout the various steps of the freezing cycle.

It is also an object of the invention to minimize splitting and cracking of certain delicate products that are frozen in the process of the invention, such as strawberries or the like.

Another object of the invention is to exclude air from the system, with its attendant water vapor which might be frozen out into snow or ice crystals and upset long term operation of the system.

A further object of the present invention is to provide precise control of the various steps of the process including precool, immersion, tempering, and postcool effects.

A further object is to provide apparatus that can perform the freezing process continuously.

It is another object of the present invention to provide a combined tempering and postcool unit which operates continuously.

An object of a modified form of the invention is to provide the postcool unit of the rotary turntable type, which can be integrated into a continuous refrigeration system.

The manner in which these and other objects of the present invention may be accomplished will be apparent to those skilled in the art from the following detailed description of the invention and the accompanying drawings in which:

Figure 1:
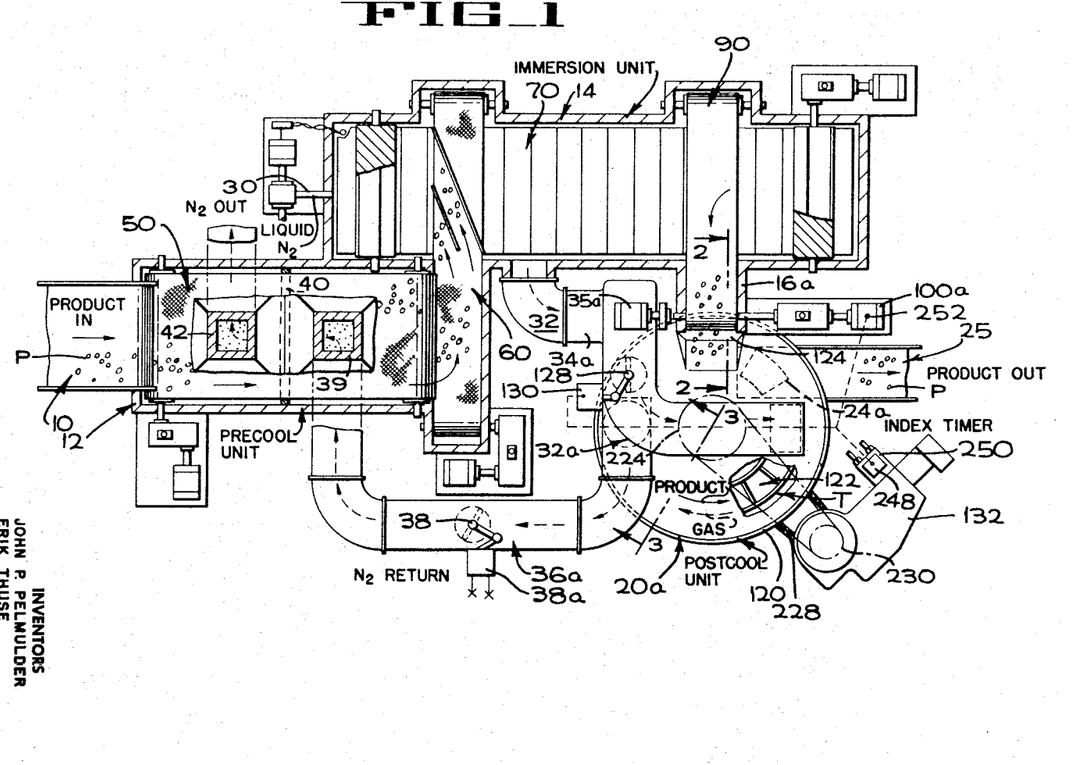
FIGURE 1 is a plan of the invention using a turntable-type postcooler.

The general arrangement of the apparatus, as illustrated in FIGURE 1 will first be described. Reference is made to the parent application for various details of the precool and immersion units not critical to the present invention. Taking up the basic parts and units in the order of product flow, the product is introduced into the system by means of a feed conveyor 10, and drops from the delivery end of the feed conveyor into an inlet chute (not shown) at the input end of a precool unit 12. The product drops onto a mesh conveyor 50 in the precool unit and is bathed in cold nitrogen gas. The product passes from the conveyor 50 of the precool unit 12 onto a cross conveyor 60 and into a bucket conveyor 70 of an immersion unit 14. Here the product is immersed in a bath of liquefied nitrogen gas $N_2$, which is at a temperature of $-320°$ F.

The product leaves the immersion unit 14 via a cross conveyor 90, and passes through a tempering unit 16a, which is a prolongation of the cross conveyor 90. Here the product is transported through a static body of cold nitrogen gas for tempering (see the parent case), after which it enters the postcool unit 20a of the present invention. In the postcool unit the product is carried counterflow to a dynamic or flowing stream of cold nitrogen gas. Freezing of the product is completed in the postcool unit 20a, after which the product is released and discharged through a discharge chute 24a into a takeaway conveyor 25.

The path of the nitrogen employed as a freezing tempering and postcooling agent in the process of the present invention will now be traced. Liquid nitrogen is admitted at line 30 to the immersion unit 14 (FIG. 1) forming a bath of liquid nitrogen in the immersion unit. When the product P is immersed in the bath of liquid nitrogen to freeze the shell or crust thereof, liquid nitrogen is evaporated and the cold gas thereby evolved enters a delivery duct 32 which leads to a blower 34a. The blower 34a directs the cold nitrogen gas through a gas inlet 32a at the postcool unit 20a. The gas entering the postcool unit is at approximately $-320°$ F. This gas flows through the moving product in the postcool unit, and leaves by way of a nitrogen gas outlet 36a, the temperature of the gas at this area being approximately $-25°$ F. The gas is thereby conducted in the nitrogen gas return line 36a through the precool unit 12.

The pressures in the various units are adjusted by a damper 38 in the return line 36, which is operated by a remote control unit 38a controlled by a pressure-responsive device in the immersion unit and a pressure-responsive device in the precool unit, as shown in the parent application, the details of which are not critical to this invention.

The returning nitrogen gas in line 36a is directed by the damper 38 to the nitrogen gas inlet duct 39, whereupon the gas enters the precool unit 12 and passes downwardly through the product P being conveyed through the precool unit. A baffle 40 within the precool unit forces the gas downwardly through the product, after which the gas reverses direction and passes through the product a second time, the gas now moving upwardly, and out of the nitrogen outlet 42. Some of the nitrogen flows out through the inlet chute that receives the product initially. The rate of egress of nitrogen gas out of the inlet chute exceeds the diffusion rate of air through the gas, so that air cannot enter the system through the inlet chute. The same conditions are maintained as to nitrogen flow through the nitrogen outlet duct 42.

Figure 2:
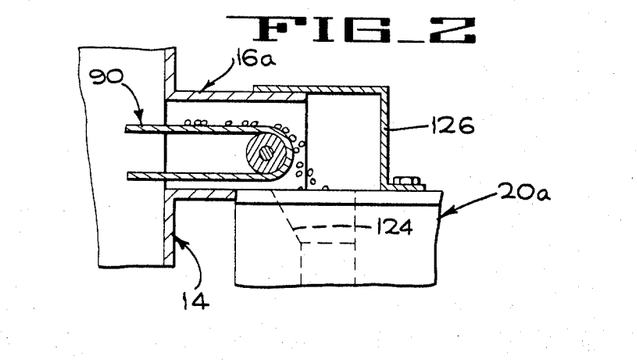
FIGURE 2 is a fragmentary section taken on lines 2—2 of FIGURE 1.

The postcool unit 20a has a double walled frame or shell indicated at 120 and carries a rotary turntable T. The turntable includes a plurality of baskets 122 (see also FIG. 3) for receiving the product P for the postcooling operation. As seen in FIGURES 1 and 2, an inlet chute 124 is provided in the postcool unit which, as seen in FIGURE 2, is shrouded at 126 to seal off the tempering unit 16a from the atmosphere. As mentioned the cold gas inlet 32a (FIG. 1) has connected therein the blower 34a driven by a motor 35a for conducting the cold gas evolved from the immersion unit 14 into the postcool unit 20a. A shut-off damper 128 and a control 130 therefor are provided in the cold gas inlet conduit 32a, in order to interrupt the delivery of cold gas to the postcool unit during the indexing of its turntable T.

As seen in FIGURE 1, an indexing mechanism 132 is provided for rotating the table through equal increments during the semicontinuous postcool operation. This is a pneumatically operated table, the details of which form no part of the invention. The table drive illustrated is a Bellows rotary feed table drive manufactured by the Bellows-Valvaire Corporation, Akron, Ohio.

Figure 3:
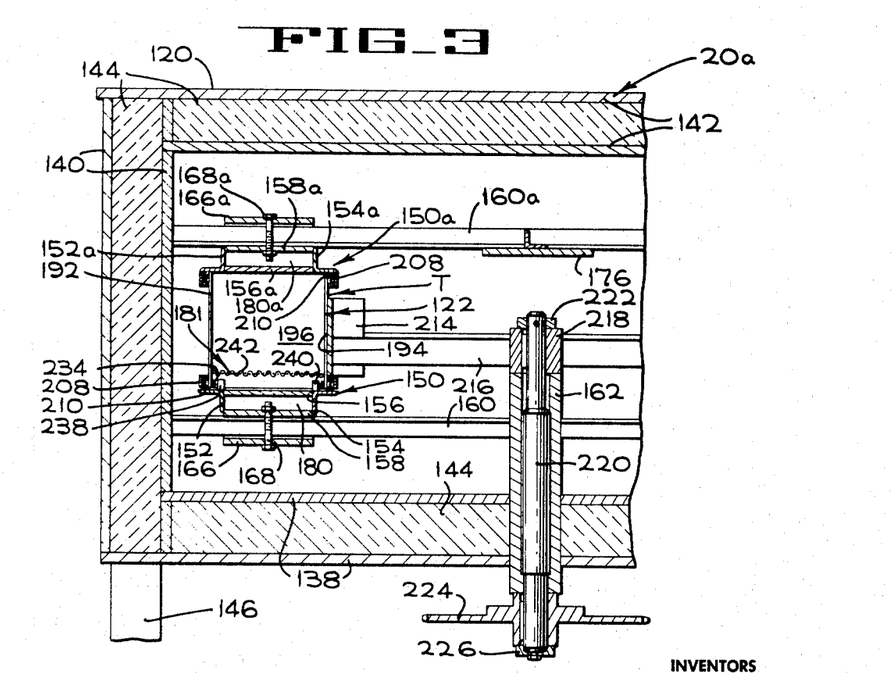
FIGURE 3 is a fragmentary vertical section of the postcool unit taken on lines 3—3 of FIGURE 1.
Figure 4:
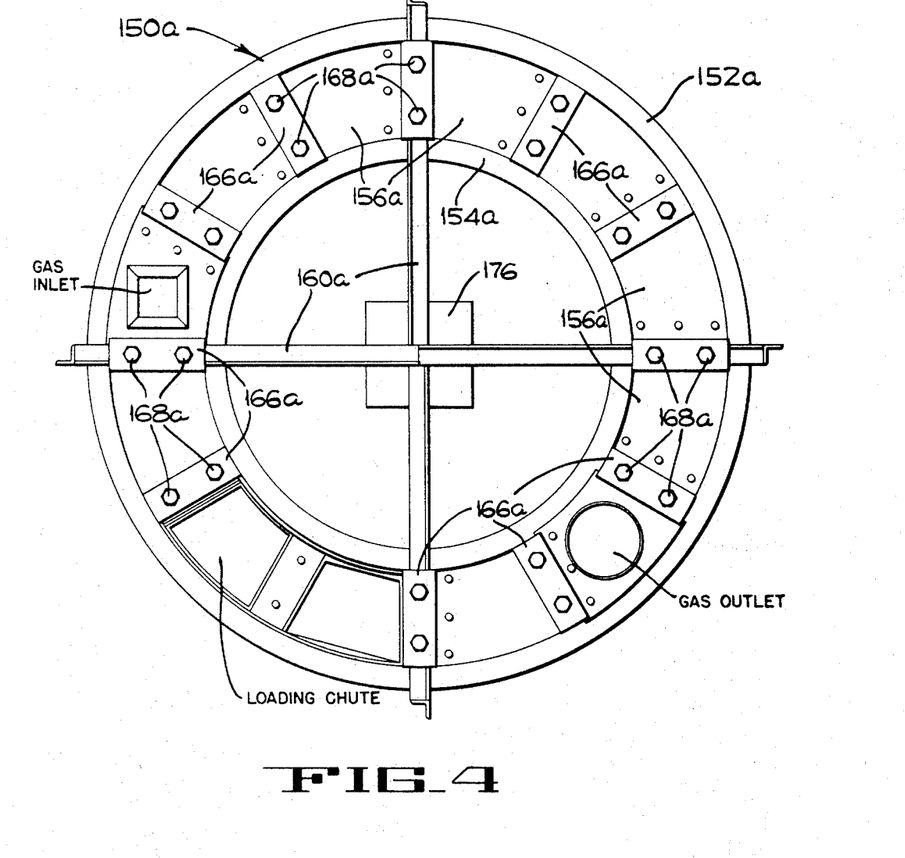
FIGURE 4 is a plan of the upper stationary ring that mates with the turntable.

Referring to FIGURE 3, a pair of spaced lower plates at 138, forming part of the shell or frame 120 are illustrated, which plates are connected to a pair of spaced cylindrical side plates 140. Similarly a pair of spaced upper plates 142 complete the basic shell, there being insulation material 144 between the plates just described. The postcool unit 20a is mounted on legs 146 which can be made to support the postcool unit at the correct position relative to the cross conveyor 90 for receiving material from the immersion unit 14, as seen in FIGURE 2.

Figure 5:
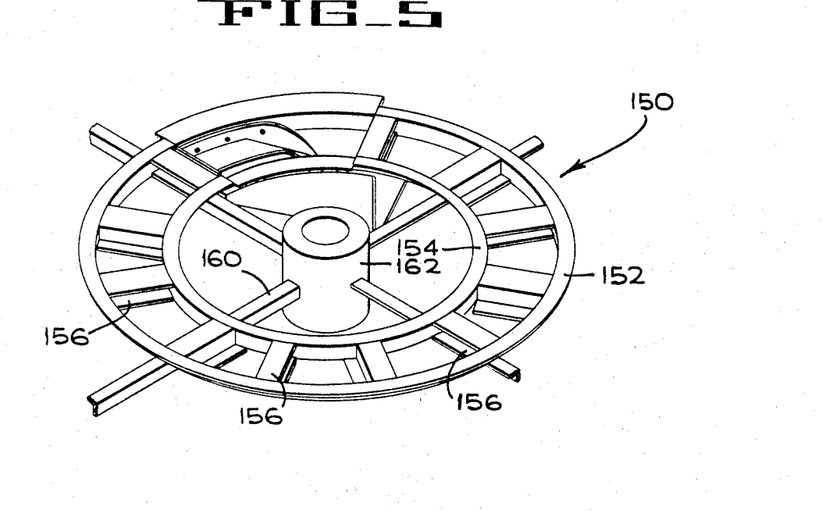
FIGURE 5 is a perspective of the lower stationary ring that mates with the turntable.
Figure 6:
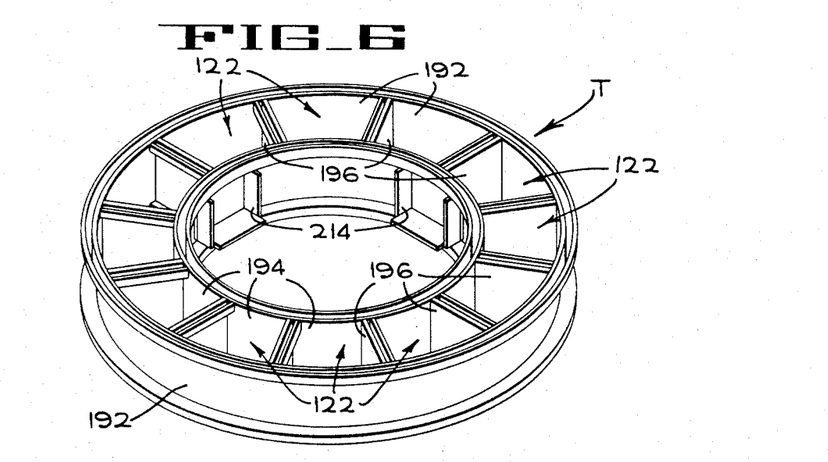
FIGURE 6 is a perspective of the turntable.
Figure 11:
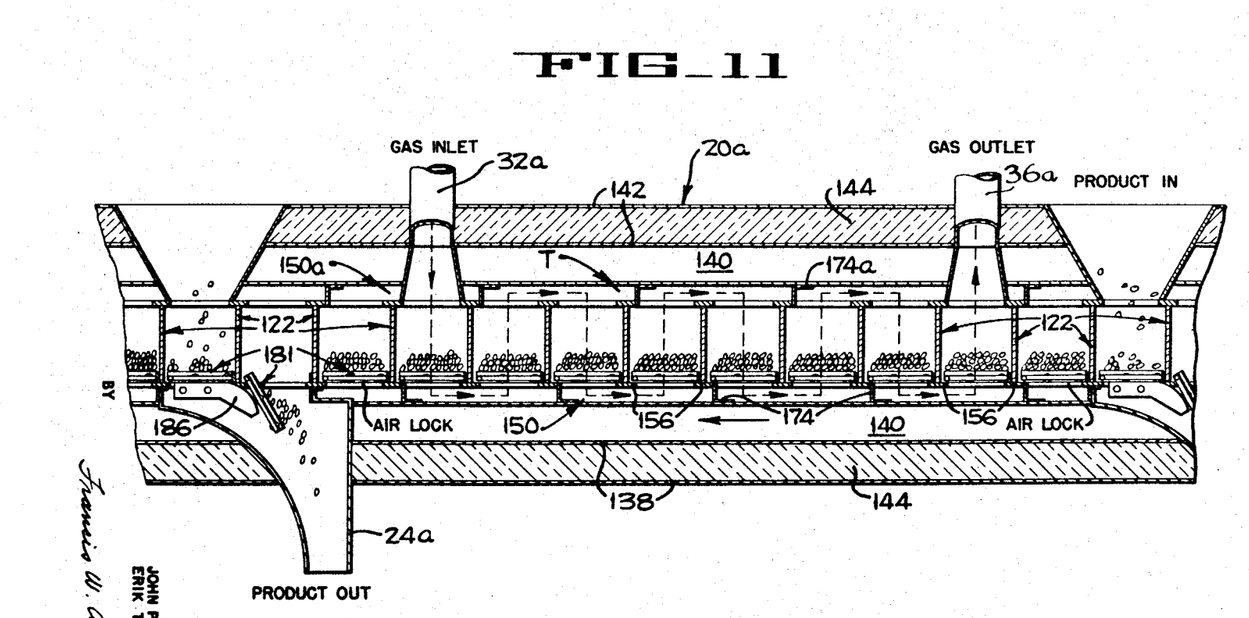
FIGURE 11 is a diagrammatic vertical developed circular section taken through the entire apparatus and showing the product and gas flow paths.

Means are provided to support and seal the baskets 122 forming part of the turntable T for providing a tortuous gas chamber through the product between the gas inlet conduit 32a and the gas return conduit 36a (FIGS. 1 and 11). For this purpose a lower ring 150 is provided (FIGS. 3, 5 and 7) which is a composite member made up of an outer annular sealing member 152 (FIG. 3) in the form of an angle member, and an inner annular member 154 of similar construction. Welded between the ring members 152 to 154 at an angular spacing corresponding to the angular dimension of the baskets 122 of the turntable T are spoke-like sealing plates 156. Angularly spaced bottom webs 158 are welded between rings 152, 154 in vertical alignment with the sealing webs 156. The ring 150 is mounted on a radial spoke member 160 in the form of angles which are welded to the plates 158 and to rings 152, 154. A central sleeve 162 is fixed in the frame or shell 120 of the postcool unit by welding or attachment to the lower plates 138 previously described, as best seen in FIG. 3.

A series of cover plates 164 form the lower boundaries of gas passages between the baskets of the turntables.

Figure 7:
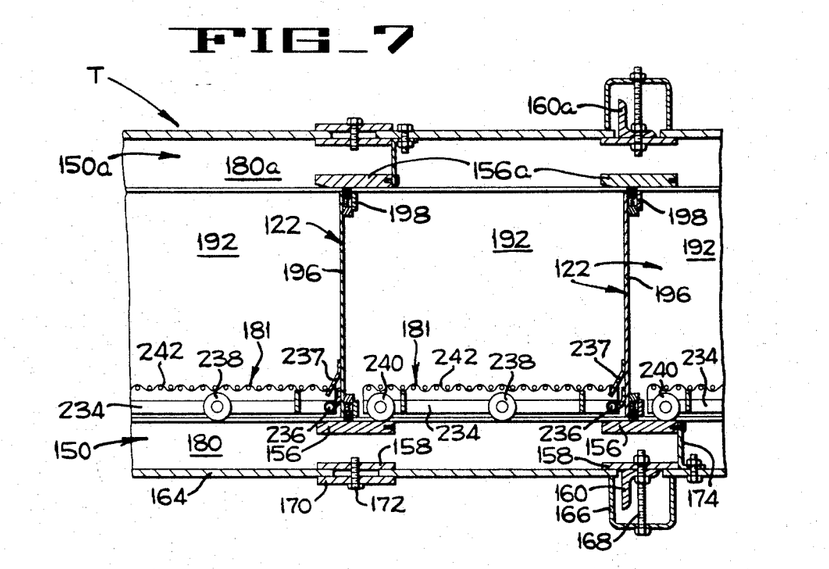
FIGURE 7 is a partial vertical circular section through the upper and lower ring and the turntable.

As seen in FIGURES 3 and 7, cover plates 164 are held by bridge clamp plates 166 and mounting studs 168. The bridge clamp plates 166 are positioned where the spoke members 160 coincide with the plates 158 that are fixed to the rings 152, 154. At the other plates 158 and 156, clamp plates 170 (FIG. 7) and studs 172 are provided to mount the lower cover plates 164. As also seen in FIGURE 7 baffles 174 are connected between the webs 156 and the cover plates 164 to provide end walls for the various gas chambers provided by the lower ring assembly 150. An upper fixed ring assembly 150a is also provided, and parts corresponding to those of the lowering assembly are designated with the same reference numbers followed by the letter a. The upper ring assembly 150a differs from the lower ring assembly 150 in that the upper spokes 160a are not joined to the sleeve 162 but are joined to a plate 176 as seen in FIGURE 3. The cover plates and baffles of the lower sealing ring 150 and the upper sealing ring 150a cooperate to form gas passages 180, 180a, respectively, as will be explained in connection with the description of the operation of this form of the invention that follows.

Figure 9:
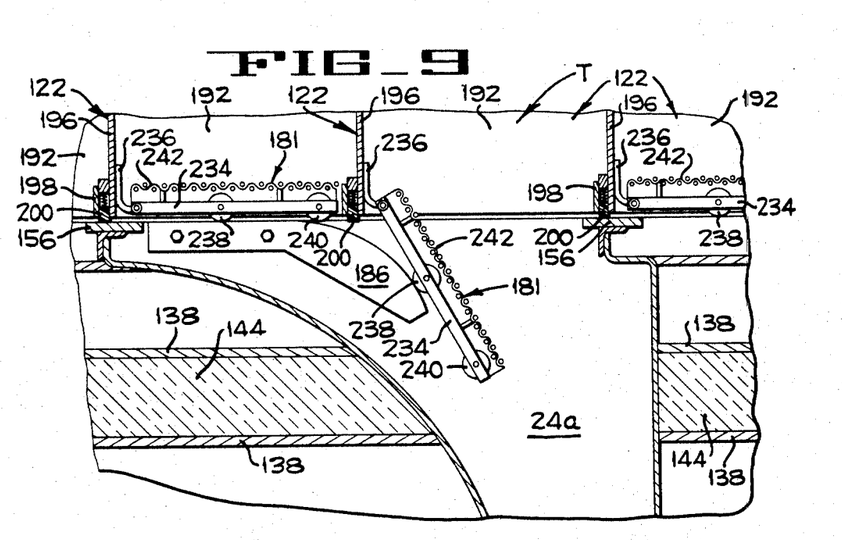
FIGURE 9 is a fragmentary vertical section through the turntable and lower ring, taken at the discharge station.
Figure 10:
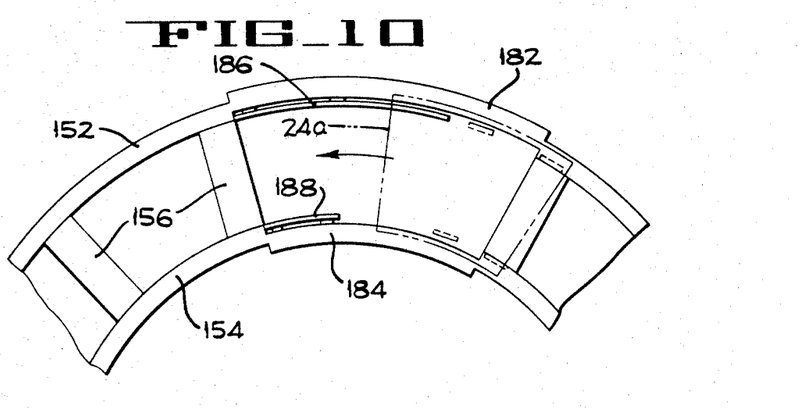
FIGURE 10 is a fragmentary plan of the lower ring at the discharge chute station.

Each of the baskets 122 on the turntable T is fitted with a wire mesh trap door 181 which is dropped to permit the frozen product to fall through the discharge chute 24a. In order to make this action possible, and as seen in FIGURES 9 and 10, a cam arrangement is provided. The outer ring 152 is provided with an offset section 182 (FIGURE 10) and the inner ring 154 is provided with an offset section 184, these sections being above the discharge chute 24a. A basket closing cam 186 is bolted to the outer ring 152 and an inner track extension 188 which is shorter than cam 186 is bolted to the inner ring 154. The cam 186 and track 188 cooperate with rollers on the hinged bottom 181 for each basket of the turntable, as will be described in the more detailed description of the turntable that follows.

As previously mentioned, the turntable T comprises a ring of product carrying baskets 122 mounted for rotation between the upper and lower rings 150 and 150a previously described. The turntable is intermittently rotated by the reciprocating turntable drive unit 132, shown in FIGURE 1. It is the function of the turntable to receive products that have been immersed in liquid nitrogen and deposited into the inlet chute 124, and to carry the products through a postcool zone countercurrent to a flow of cold nitrogen gas introduced through the gas inlet conduit 32a, and to bring the postcooled product over the discharge chute 24a and empty the product through that chute. The product so emptied, will have been postcooled and will have had enough heat removed so that upon equalization of the temperature of the product throughout, it will be at a uniform sub-freezing temperature, a temperature of 0° F. in the example being described.

Figure 8:
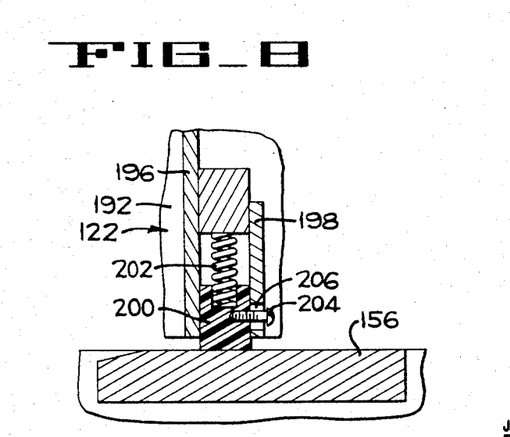
FIGURE 8 is a fragmentary enlarged section of the turntable seal.

Referring primarily to FIGS. 3, 6, 7 and 8, the turntable T has an outer annular shell 192 and an inner annular shell 194. These shells being joined by radial walls 196 for forming the baskets 122. The radial walls 196 are formed with upper and lower sealing strip channels 198, which slidably receive plastic sealing strips 200 (FIG. 8). The sealing strips 200 are urged outwardly by a series of coil springs 202, and are prevented from being forced clear of the turntable by retainer screws 204 which slide in slots 206 formed in the walls of channels 198. A similar sealing construction is provided in the form of upper and lower annular channels 208 formed on the inner and outer shells 192 and 194 of the turntable. Annular sealing strips 210 slide in channels 208 for engaging the angle members 152, 154 of the lower ring 150, and angle members 152a, 154a of the upper ring 150a. The annular sealing strips 208 may be segmented and are spring expelled and retained as are the radial sealing strips shown in FIGURE 8.

In order to mount the baskets on the turntable for rotation, sets of cooperating mounting brackets 214 are mounted on the inner shell 194 and fastened to radial mounting spokes 216. The inner end of these spokes being welded to a collar 218. The collar 218 is keyed to a shaft 220 that rotates in the fixed sleeve 162 previously described, the collar being retained by a retainer collar 222. The lower end of the shaft 220 has keyed thereto a drive sprocket 224 which is retained by a retainer washer 226 on the shaft. A chain 228 seen in FIGURE 1, passes around the sprocket 224, and a sprocket 230 on the index unit 132.

As previously mentioned, each basket has a bottom in the form of a trap door indicated generally at 181, and best seen in FIGURES 3, 7 and 9. The door is formed of an open frame 234 with a trailing end thereof connected to a hinge assembly 236 (FIG. 7) on a wall 196 of each basket 122. A deflector shield 237 is mounted above each of the hinge assemblies 236. In order to support the trap door 181 of each basket except when the basket is over the discharge chute 24a, the frame 234 of each basket has an outside midroll 238, and an inside trailing roll 240 mounted thereon. The frame 234 of the trap door bottom 181 also mounts a wire mesh or screen member 242, for supporting the product while permitting postcooling gas to pass through the product.

As mentioned, in the form of the invention now being described, the turntable T is intermittently indexed from station to station. During delivery of the product to a basket opposite the inlet chute 24, and discharge of the postcooled product from the delivery chute 24a, the turntable is stationary, whereas the conveyor 90 that delivers product material from the immersion unit to the postcool unit 20a will be in operation. Also, while the turntable is stationary, gas will be pumped through the inlet line 32a by the blower 34a, through the product in the baskets of the turntable, and out the return line 36a. Thus, during this period the damper 128, FIGURE 1, will be opened under control of the control unit 130 provided for the damper. During the indexing operation, in order to conserve nitrogen gas, it is desirable to close the damper 128 in the gas conduit 32a, and to interrupt action of the cross conveyor 90 that delivers the product to the postcool unit 20a.

The operation just described is controlled by an index timer 248 (FIG. 1), the details of which are not critical to the present invention. This timer controls a valve assembly 250 for indexing the feed table drive 132, and controls a starter 252 for the motor 100a that operates the cross conveyor 90 that feeds the postcool unit 20a. The index timer also operates the control unit 130 for closing the damper 128 in the gas delivery conduit 32a, in the manner just described. As mentioned, details of these controls which can be supplied by the trade, are not critical to the invention, and hence are not described. It is only necessary that timing sequence explained above be carried out by the timer and its associated controls.

Each of the conveyors of the system, namely the precool conveyor 50, the cross conveyor 60 that feeds the immersion unit 14, the immersion conveyor 70, and the cross conveyor 90 that feeds the postcool unit 20a, are individually operated through variable speed transmissions, so that the process times for the individual steps of the cycle carried out by the system of the present invention can be adjusted to produce the desired results.

The diagram in FIGURE 11 clearly illustrates the respective paths of the product and the gas through the postcool unit 20a. As previously mentioned, the product is introduced into the postcool unit through the delivery chute 124, and during the introduction of the product, the turntable T is stationary, and a basket 122 of the turntable will be disposed beneath the chute 124. At the discharge station, the trailing rollers 240 will have dropped clear of their tracks, and the trap door 181 of the basket (see FIG. 9), will have fallen to discharge the product into the discharge chute 24a. The turntable will be stationary at this time, and cold nitrogen gas at −320° F. enters the conduit 32a and passes downwardly through the product in the basket beneath the gas inlet conduit. The gas will then be deflected through a chamber 180 formed by the lower ring 150, up through the next basket, and through a chamber 180a in the upper ring 150a. This path of the gas through the product continues, as seen in FIG. 11, until the gas leaves the postcool unit by means of the outlet conduit 36a, which directs the gas to the precool chamber 12. It is noted that the motion of the turntable, and hence of the product, is in a direction countercurrent to the direction of the flow of gas through the postcool unit, which provides the heat exchange advantages and efficiency previously referred to in connection with the description of the first embodiment of the invention.

Once the seal between the baskets and the radial webs or plates 156, 156a is broken, the gas inlet chamber 32a will be connected momentarily to the discharge chute 24a. Also, the breaking of the seals between the webs 156, 156a will interconnect the gas passages 180 in the lower ring 150 and passages 180a in the upper ring 150a to partially bypass the product. However, during the indexing operation, the damper 128 in the gas inlet conduit 32a will have been closed in the manner previously described to conserve the cooling gas. If the economics of the operation is such that there is no need to conserve the cooling gas in this manner, the shut off damper 128 may be left open or dispensed with. During the indexing operation, the product merely accumulates on the cross conveyor 90 (FIG. 1), which serves as a buffer storage device, and also provides the tempering action, as previously described.

The baffles 174 and 174a can be reduced in number from the arrangement shown in FIG. 11 so that some baskets are in effect connected in parallel with one another. Also, it is not necessary that there be 12 baskets on the turntable T. The number of baskets and their physical geometry depending upon the rate of product flow, the nature of the product, and the rate of gas flow through the product. During each indexing operation, the mid-roller 238, which was previously resting on the cam 186 (FIG. 9), will ride up on the cam and will bring the trap door bottom 181 to its horizontal position, whereupon the mid-roller 238 supports the trap door bottom completely. When the basket is turned away from the trap door section, both the mid-roller 238 and the trailing rollers 240 will again ride on the annular tracks 152, 154 so that the bottom of the basket will be closed throughout the balance of the cycle.

Having completed a detailed description of the invention so that those skilled in the art may practice same, we claim:

1. A refrigeration unit comprising an endless circular refrigeration chamber, a turntable comprising a circular array of product carrying baskets connected for rotary motion through said refrigeration chamber, adjacent product inlet and outlet stations for said chamber, a refrigerant gas inlet for said chamber adjacent said product outlet station and a refrigerant gas outlet for said chamber adjacent said product inlet station, means for establishing a tortuous refrigerant gas path through said baskets from said gas inlet to said gas outlet to establish cooling chamber, and means for rotating said turntable in a direction to move said baskets through the refrigeration chamber countercurrent to the flow of refrigerant gas therethrough, said baskets having closed sides, an open top, and a trap door mesh bottom, means for causing the bottom of each basket to drop at said product outlet station, and means for holding said trap door bottom in its raised position around the remainder of said refrigeration chamber.

2. A refrigeration unit comprising an endless refrigeration chamber formed for confining refrigerant gas, a turntable comprising an endless array of product carrying baskets connected for rotary motion through said refrigeration chamber, said baskets having closed sidewalls and upper and lower gas conducting portions, product inlet and outlet stations for said chamber, a refrigerant gas inlet for said chamber adjacent said product outlet station and a refrigerant gas outlet for said chamber adjacent said product inlet station, air locks between said product inlet and outlet stations and said gas inlet and outlet, staggered conduit means above and below said baskets for establishing a tortuous refrigerant gas path up and down through said baskets from said gas inlet to said gas outlet to form an elongate cooling chamber, and means for rotating said turntable to move said baskets through said refrigeration chamber.

3. The refrigeration unit of claim 2 wherein said staggered conduit means have a dimension in the direction of turntable motion substantially equal to the width of two baskets, said turntable rotating means having means for indexing the turntable intermittently through the arc of one basket, and wherein a damper is provided for said gas inlet, and means are provided for closing said damper during indexing of the turntable.

References Cited

UNITED STATES PATENTS

| | | | |
|---|---|---|---|
| 2,077,608 | 4/1937 | Wood | 62—382 X |
| 2,277,382 | 3/1942 | Botz | 62—380 |
| 2,697,918 | 12/1954 | Comstock | 62—381 X |
| 2,784,566 | 3/1957 | Reynolds | 62—381 X |
| 2,784,567 | 3/1957 | Reynolds | 62—381 X |

EDWARD J. MICHAEL, *Primary Examiner.*

U.S. Cl. X.R.

62—374